(12) United States Patent
Su et al.

(10) Patent No.: US 11,688,907 B2
(45) Date of Patent: Jun. 27, 2023

(54) END CAP ASSEMBLY, BATTERY CELL AND MANUFACTURING METHOD THEREOF, BATTERY, AND ELECTRIC APPARATUS

(71) Applicant: CONTEMPORARY AMPEREX TECHNOLOGY CO., LIMITED, Ningde (CN)

(72) Inventors: Huasheng Su, Ningde (CN); Chengyou Xing, Ningde (CN); Wenlong Kang, Ningde (CN); Quankun Li, Ningde (CN); Peng Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/842,775

(22) Filed: Jun. 16, 2022

(65) Prior Publication Data
US 2022/0320643 A1    Oct. 6, 2022

Related U.S. Application Data

(63) Continuation of application No. PCT/CN2020/135949, filed on Dec. 11, 2020.

(51) Int. Cl.
*H01M 50/147* (2021.01)
*H01M 50/143* (2021.01)
(Continued)

(52) U.S. Cl.
CPC ....... *H01M 50/147* (2021.01); *H01M 50/102* (2021.01); *H01M 50/143* (2021.01);
(Continued)

(58) Field of Classification Search
None
See application file for complete search history.

(56) References Cited

U.S. PATENT DOCUMENTS

2006/0216578 A1* 9/2006 Kwon ................. H01M 50/528
429/174
2020/0358048 A1* 11/2020 Kim .................... H01M 50/107

FOREIGN PATENT DOCUMENTS

CN        202749425 U     2/2013
CN        208225974 U     12/2018
(Continued)

OTHER PUBLICATIONS

The World Intellectual Property Organization (WIPO) International Search Report and Written Opinion for PCT/CN2020/135949 dated Sep. 15, 2021 13 pages (with translation).

*Primary Examiner* — Alix E Eggerding
(74) *Attorney, Agent, or Firm* — Anova Law Group, PLLC

(57) ABSTRACT

An end cap assembly includes an end cap configured to close a housing of a battery cell, an adapting member configured to electrically connect an electrode assembly of the battery cell to an electrode terminal of the battery cell, and a supporting member between the adapting member and the end cap. An explosion-proof mechanism provided at the end cap is configured to be actuated to release an internal pressure of the battery cell when thermal runaway occurs in the battery cell. The supporting member is made of a high-temperature-resistant material. An orthographic projection of the adapting member on a first surface of the end cap at least partially overlaps an orthographic projection of the explosion-proof mechanism on the first surface of the end cap and an orthographic projection of the supporting member on the first surface. The first surface is a surface of the end cap facing the housing.

16 Claims, 8 Drawing Sheets

(51) Int. Cl.
    *H01M 50/30*     (2021.01)
    *H01M 50/102*     (2021.01)
    *H01M 50/533*     (2021.01)
    *H01M 50/543*     (2021.01)

(52) U.S. Cl.
    CPC ......... *H01M 50/30* (2021.01); *H01M 50/533* (2021.01); *H01M 50/543* (2021.01)

(56) References Cited

FOREIGN PATENT DOCUMENTS

| | | |
|---|---|---|
| CN | 111490212 A | 8/2020 |
| JP | 2019053934 A | 4/2019 |

* cited by examiner

A-A

END CAP ASSEMBLY, BATTERY CELL AND MANUFACTURING METHOD THEREOF, BATTERY, AND ELECTRIC APPARATUS

CROSS-REFERENCE TO RELATED APPLICATION

This application is a continuation of International Application No. PCT/CN2020/135949, filed Dec. 11, 2020, the entire content of which is incorporated herein by reference.

TECHNICAL FIELD

Embodiments of this application relate to the field of batteries, and in particular, to an end cap assembly, a battery cell and a manufacturing method thereof, a battery, and an electric apparatus.

BACKGROUND

With development of scientific technologies, batteries are widely used in portable electronic devices such as mobile phones, digital cameras, and laptop computers, and have broad application prospects in electric transportation such as electric vehicles and electric bicycles and in large- and medium-sized electric devices such as energy storage facilities, becoming a key technical means of addressing global issues such as energy crisis and environmental pollution.

Battery use safety is an important factor for measuring battery performance. A battery cell included in a battery in the existing technologies generally includes a housing with an opening at each of two ends, end caps for closing the openings on the housing, an electrode terminal on the end cap, and an adapting member at a side of the end cap close to the housing. The adapting member is configured to electrically connect the electrode terminal and an electrode assembly. In order to improve the use safety of the battery cell, an explosion-proof mechanism is generally provided at the end cap. When thermal runaway occurs in the battery cell, the explosion-proof mechanism can discharge high-temperature and high-pressure emissions generated in the battery cell, to reduce a pressure in the battery cell and prevent the battery cell from exploding in the case of thermal runaway.

However, when thermal runaway occurs in the battery cell, the explosion-proof mechanism is sometimes difficult to open normally, and the end cap and the housing are separated under a high pressure in the battery cell, causing explosion and other risks in severe cases.

SUMMARY

In view of the foregoing problem, embodiments of this application provide an end cap assembly, a battery cell and a manufacturing method thereof, a battery, and an electric apparatus, to reduce the possibility of blocking an explosion-proof mechanism by an adapting member, ensure the explosion-proof mechanism of the battery cell to operate normally in the case of thermal runaway, and improve use safety of the battery cell.

A first aspect of this application provides an end cap assembly applied to a battery cell, including:

an end cap, configured to close a housing of the battery cell, where an explosion-proof mechanism is provided at the end cap, and the explosion-proof mechanism is capable of being actuated to release an internal pressure of the battery cell when thermal runaway occurs in the battery cell; and an adapting member, configured to electrically connect an electrode assembly of the battery cell to an electrode terminal of the battery cell, where an orthographic projection of the adapting member on a first surface of the end cap at least partially overlaps an orthographic projection of the explosion-proof mechanism on the first surface of the end cap, and the first surface is a surface of the end cap facing the housing.

A supporting member is provided between the adapting member and the end cap, and made of a high-temperature-resistant material. The orthographic projection of the adapting member on the first surface at least partially overlaps an orthographic projection of the supporting member on the first surface, such that when thermal runaway occurs in the battery cell, the supporting member is capable of supporting the adapting member to prevent the adapting member from blocking the explosion-proof mechanism.

In the foregoing solution, the supporting member made of the high-temperature-resistant material is not easy to melt and deform when thermal runaway occurs in the battery cell. In this way, when the adapting member is deformed in the case of thermal runaway, the adapting member is blocked by the supporting member and does not butt up against the explosion-proof mechanism, blocking the explosion-proof mechanism. Therefore, when thermal runaway occurs, high-temperature and high-pressure emissions in the battery cell can actuate the explosion-proof mechanism and be discharged through the explosion-proof mechanism, reducing the possibility of burning or even explosion of the battery cell, and improving safety of the battery cell in use.

In some embodiments, a melting point of the supporting member is greater than 300° C.

In the foregoing solution, when thermal runaway occurs in the battery cell, a highest temperature of emissions in the battery cell is within 300° C., and the supporting member is not deformed by melting in this case, can therefore support the adapting member stably in the case of thermal runaway, ensuring normal gas discharge through the explosion-proof mechanism.

In some embodiments, the supporting member is made of an insulating material.

In the foregoing solution, the supporting member does not cause short circuit during use.

In some embodiments, the supporting member includes a supporting block disposed between the adapting member and the end cap.

In some embodiments, an orthographic projection of the supporting block on the first surface is staggered from the orthographic projection of the explosion-proof mechanism on the first surface.

In some embodiments, an isolating component is provided between the adapting member and the end cap, the isolating component is configured to insulate the adapting member from the end cap, and the supporting block is fixed to the isolating component.

In the foregoing solution, the isolating component can not only insulate the adapting member and the end cap, but also fix the supporting blocks into positions, to prevent the supporting block from shifting and failing to provide good support for the adapting member.

In some embodiments, the isolating component is provided with accommodating grooves, and the supporting blocks are disposed in the accommodating grooves.

In some embodiments, an opening is provided at a side of the accommodating groove for putting the supporting block in.

In some embodiments, the opening faces the end cap, one end of the supporting block butts up against a bottom wall of the accommodating groove, and the other end of the supporting block butts up against the end cap; or the opening faces the adapting member, one end of the supporting block butts up against a bottom wall of the accommodating groove, and the other end of the supporting block butts up against the adapting member.

In the foregoing solution, the side wall of the accommodating groove limits a position of the supporting block in a direction perpendicular to the first surface, so that the supporting block can always be located at the position corresponding to the adapting member. The two ends of the supporting block respectively butt up against the bottom wall of the accommodating groove and against the end cap or the adapting member, which can prevent the supporting block from disengaging from the opening of the accommodating groove, resulting in a situation that it is difficult to support the adapting member in the case of thermal runaway.

In some embodiments, the isolating component is made of a high-temperature-resistant insulating material.

In the foregoing solution, when thermal runaway occurs, the isolating component is not easy to melt, and not only plays a role of insulation, but also supports the adapting member, to prevent the adapting member from blocking the explosion-proof mechanism.

In some embodiments, the supporting block and the isolating component are made of a same material and are integrally formed.

In the foregoing solution, the supporting block and the isolating component are processed and formed together, which greatly improves processing efficiency of the end cap assembly and reduces manufacturing costs of the end cap assembly.

In some embodiments, the adapting member includes a first connecting section, a second connecting section, and a third connecting section, where the first connecting section is connected to the electrode terminal of the battery cell, the third connecting section is configured to be connected to an electrode assembly in the housing of the battery cell, and the second connecting section connects the first connecting section and the third connecting section.

An orthographic projection of the first connecting section on the first surface does not overlap the orthographic projection of the explosion-proof mechanism on the first surface, and an orthographic projection of the third connecting section on the first surface at least partially overlaps the orthographic projection of the supporting member on the first surface, such that when thermal runaway occurs in the battery cell, the supporting member is capable of supporting the third connecting section to prevent the third connecting section from blocking the explosion-proof mechanism.

In the foregoing solution, the adapting member directly supports the third connecting section, such that there is always a gap between the first connecting section and the third connecting section, for emissions generated when thermal runaway occurs in the battery cell to pass through. In addition, the supporting member is located within heights of the first connecting section and the third connecting section, and does not occupy additional space inside the housing, thereby reducing a volume of the battery cell and increasing energy density of the battery cell.

In some embodiments, the adapting member is provided with a through-hole directly facing the explosion-proof mechanism for emissions generated when thermal runaway occurs in the battery cell to pass through.

In the foregoing solution, the emissions from the battery cell can reach the explosion-proof mechanism through the through-hole, and be discharged through the explosion-proof mechanism, further ensuring a smooth gas discharge from inside to outside of the battery cell.

A second aspect of this application provides a battery cell, including an electrode assembly, a housing, and the end cap assembly in the foregoing embodiments.

The housing is a hollow chamber with an opening, the electrode assembly is accommodated in the chamber, and the end cap assembly covers the opening of the housing.

In the foregoing solution, when thermal runaway occurs, high-temperature and high-pressure emissions in the battery cell can actuate the explosion-proof mechanism and be discharged through the explosion-proof mechanism, to prevent the battery cell from burning or even exploding, and ensure safety of the battery cell in use.

A third aspect of this application provides a battery, including two or more battery cells in the foregoing embodiments.

In the foregoing solution, when thermal runaway occurs in one of the battery cells, high-temperature and high-pressure emissions in this battery cell can actuate the explosion-proof mechanism and be discharged through the explosion-proof mechanism, to prevent other battery cells from being affected due to heat spreading, prevent the battery from burning or even exploding, and ensure safety of the battery in use.

A fourth aspect of this application provides an electric apparatus, including the battery cell in the foregoing embodiments, where the battery cell is configured to provide electric energy.

In the foregoing solution, in a process of using the battery by the electric apparatus to provide power, the battery is not easy to explode, and use safety of the apparatus is high.

A fifth aspect of this application provides a manufacturing method of end cap assembly, the manufactured end cap assembly is used for a battery cell, and the method includes:

providing an end cap, where the end cap is configured to close a housing of the battery cell, an explosion-proof mechanism is provided at the end cap, and the explosion-proof mechanism is capable of being actuated to release a pressure in the battery cell when thermal runaway occurs in the battery cell;

providing an adapting member, where the adapting member is configured to electrically connect an electrode assembly of the battery cell to an electrode terminal of the battery cell, an orthographic projection of the adapting member on a first surface of the end cap at least partially overlaps an orthographic projection of the explosion-proof mechanism on the first surface of the end cap, and the first surface is a surface of the end cap facing the housing; and providing a supporting member, where the supporting member is located between the adapting member and the end cap, and made of a high-temperature-resistant insulating material, and the orthographic projection of the adapting member on the first surface at least partially overlaps an orthographic projection of the supporting member on the first surface, such that when thermal runaway occurs in the battery cell, the supporting member is capable of supporting the adapting member to prevent the adapting member from blocking the explosion-proof mechanism.

A sixth aspect of this application provides a manufacturing method of battery cell, including:

providing a housing, where the housing is a hollow chamber with an opening;

providing an electrode assembly, where the electrode assembly is placed into the chamber of the housing;

providing an end cap, where the end cap is configured to close the housing of the battery cell, an explosion-proof mechanism is provided at the end cap, and the explosion-proof mechanism is capable of being actuated to release an internal pressure of the battery cell when thermal runaway occurs in the battery cell;

providing an adapting member, where the adapting member is configured to electrically connect an electrode assembly of the battery cell to an electrode terminal of the battery cell, an orthographic projection of the adapting member on a first surface of the end cap at least partially overlaps an orthographic projection of the explosion-proof mechanism on the first surface of the end cap, and the first surface is a surface of the end cap facing the housing; and providing a supporting member, where the supporting member is located between the adapting member and the end cap, and made of a high-temperature-resistant insulating material, and the orthographic projection of the adapting member on the first surface at least partially overlaps an orthographic projection of the supporting member on the first surface, such that when thermal runaway occurs in the battery cell, the supporting member is capable of supporting the adapting member to prevent the adapting member from blocking the explosion-proof mechanism.

The foregoing descriptions are merely the general descriptions of the technical solutions of the embodiments of this application. For clearer understanding, the technical means of the embodiments of this application can be implemented according to content of this specification. To make the foregoing and other objectives, features and advantages of the embodiments of this application clearer, the following particularly lists the specific implementations of this application.

BRIEF DESCRIPTION OF DRAWINGS

To describe the technical solutions in the embodiments of this application more clearly, the following briefly describes the accompanying drawings for describing the embodiments. Apparently, the accompanying drawings in the following descriptions show some embodiments of this application, and persons of ordinary skill in the art may still derive other drawings from these accompanying drawings without creative efforts.

DESCRIPTION OF EMBODIMENTS

Figure 1:
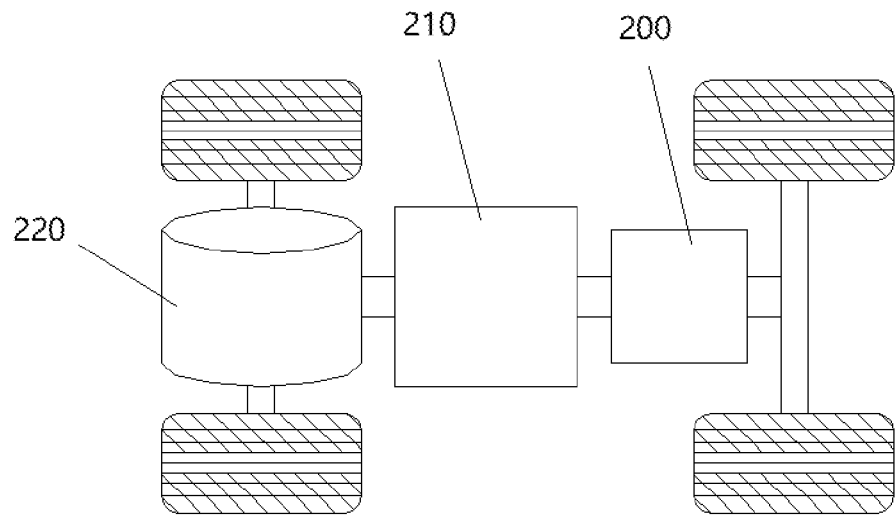
FIG. 1 is a schematic diagram of an electric apparatus according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all of the embodiments of this application. All other embodiments obtained by persons of ordinary skill in the art based on the embodiments of this application without creative efforts shall fall within the scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application.

The terms "including" and "having" and any other variations thereof in the specification, the claims and the brief description of drawings of this application are intended to cover but not exclude other content. The word "a" or "an" does not exclude the presence of plurality. In the descriptions of this application, unless otherwise specified, "a plurality of" means two or more than two. Likewise, "a plurality of groups" means two or more than two groups.

The term "embodiment" described herein means that specific features, structures or characteristics in combination with descriptions of the embodiments may be incorporated in at least one embodiment of this application. The word "embodiment" in various places in the specification does not necessarily refer to a same embodiment, or an independent or alternative embodiment that is exclusive of other embodiments. Persons skilled in the art explicitly and implicitly understand that the embodiments described herein may be combined with another embodiments.

In the descriptions of this application, it should be noted that, unless otherwise specified and defined explicitly, the terms "installed", "connected" and "connection" should be understood broadly. For example, "connected" or "connection" of a mechanical structure may indicate physical connection. For example, the physical connection may be fixed connection, for example, fixed connection by using a fixing member such as a screw, a bolt or other fixing members; or the physical connection may be detachable connection, for example, connection by mutual clamping or clamping; or the physical connection may be an integral connection, for example, connection by welding, bonding or integral forming. "Connected" or "connection" of a circuit structure may indicate physical connection, and may also indicate electrical connection or signal connection, for example, may be direct connection, that is, the physical connection, may be indirect connection by using at least one element in between as long as circuit communication is implemented, and may also be communication between two elements; and the signal connection may be signal connection by using a circuit, and may also be signal connection by using a media medium, such as a radio wave. Persons of ordinary skill in the art may understand specific meanings of the preceding terms in this application based on a specific situation.

In the descriptions of the specification, it should be understood that the directional terms such as "above" and "under" described in the embodiments of this application are described from angles shown in the accompanying drawings, and should not be understood as a limitation on the embodiments of this application.

In addition, the terms "first", "second", and the like in the specification and the claims or the above accompanying drawings of this application are used to distinguish between different objects but not describe a specific sequence, and can explicitly or implicitly include one or more features. This application is hereinafter further described in detail with reference to specific embodiments and accompanying drawings.

The battery mentioned in the embodiments of this application refers to an individual physical module that includes one or more battery cells for providing a higher voltage and capacity. For example, the battery mentioned in this application may include a battery module, a battery pack, or the like, which are collectively referred to as a battery herein for ease of description. The battery generally includes a box body for packaging one or more battery cells. The box body can prevent a liquid or another foreign matter from affecting charging or discharging of the battery cell.

In this application, the battery cell may include a lithium-ion secondary battery, a lithium-ion primary battery, a lithium-sulfur battery, a sodium-lithium-ion battery, a sodium-ion battery, a magnesium-ion battery, or the like, and this is not limited in the embodiments of this application. The battery cell may be cylindrical, flat, rectangular, or another shape, and this is also not limited in the embodiments of this application. The battery cells are usually categorized into three types depending on their packaging: cylindrical battery cell, square battery cell and soft-pack battery cell, and this is also not limited in the embodiments of this application.

The battery cell includes a shell, an electrode assembly, and an electrolyte. The electrode assembly includes a positive electrode plate, a negative electrode plate, and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Using the lithium-ion battery as an example, a material of the positive electrode current collector may be aluminum, and the positive electrode active substance may be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. A material of the negative electrode current collector may be copper, and the negative electrode active substance can be carbon, silicon, or the like. To ensure that a large current can pass through them without fusing, there are a plurality of positive electrode tabs stacked together, and there are a plurality of negative electrode tabs stacked together. A material of the separator may be PP, PE, or the like. In addition, the electrode assembly may have a winding structure or a laminated structure, and this is not limited in the embodiments of this application.

The shell includes a housing and an end cap assembly. The housing is a structure with a hollow chamber, and is provided with an opening. After the electrode assembly is placed into the housing from an opening, the end cap assemblies are configured to close the openings to seal the shell, to prevent gaseous, liquid, or solid substances from circulating between the inside and outside of the shell, and affect performance of the battery cell.

The end cap assembly has electrode terminals, which extend from the inside to the outside of the end cap assembly, and include a positive electrode terminal and a negative electrode terminal. The positive electrode terminal is electrically connected to a positive tab through an adapting member, that is, one end of the adapting member is connected to the electrode terminal, the other end is connected to the positive tab; and the negative electrode terminal is electrically connected to a negative tab through an adapting member, that is, one end of the adapting member is connected to the negative electrode terminal, and the other end is connected to the negative tab, to achieve current conduction inside and outside of the battery cell.

Many design factors should be considered in the development of battery technologies, for example, energy density, cycle life, discharge capacity, charge and discharge rate, and other performance parameters. In addition, safety of the battery needs to be considered, and one of important factors that affect use safety of the battery is battery thermal runaway.

During use of the battery, under the condition that an external short circuit, overcharge, nail penetration, plate impact, or the like occurs in one of the battery cells, the battery cell is prone to thermal runaway. When thermal runaway occurs, the battery cell discharges emissions, including one or more of high-temperature exhaust gas, volatilized high-temperature electrolyte, fragments of the positive electrode plate, negative electrode plate, and separator because of dissolution or breaking, high-temperature and high-pressure gas and flame generated by the reaction, and the like. If the emissions are not discharged in a timely manner, temperature and pressure in the battery cell may continuously rise, and even an explosion may occur.

Therefore, in designing a battery cell, an explosion-proof mechanism is provided at an end cap of the battery cell. The explosion-proof mechanism refers to an element or a component that can be actuated to release an internal pressure and/or internal substances of the battery cell when the internal pressure or an internal temperature of the battery cell reaches a predetermined threshold. The explosion-proof mechanism may be specifically used in a form of an explosion-proof valve, such as a gas valve, a pressure relief valve, or a safety valve, and may be specifically used as a pressure-sensitive or temperature-sensitive element or structure, that is, when the internal pressure or temperature of the battery cell reaches a predetermined threshold, the explosion-proof mechanism executes an action, or when a thin and weak structure provided in the explosion-proof mechanism is damaged, an opening or channel for releasing the internal pressure is accordingly formed. The threshold in this application may be a pressure threshold or a temperature threshold. Design of the threshold varies according to different design requirements. For example, the threshold may be designed or determined based on an internal pressure or internal temperature of a battery cell that is considered to be dangerous or at a risk of losing control. In addition, the threshold may depend on, for example, a material used in one or more of the positive electrode plate, the negative electrode plate, the electrolyte, and the separator in the battery cell.

The term "actuated" mentioned in this application means that the explosion-proof mechanism acts or is activated to a specified state, so that the internal pressure of the battery cell can be released. The action of the explosion-proof mechanism may include, but is not limited to: that at least part of the explosion-proof mechanism is cracked, broken, torn or opened, or the like. When the explosion-proof mechanism is actuated, the high-temperature and high-pressure substances in the battery cell will be discharged as emissions from the actuated site. In this way, the pressure of the battery cell can be released when the pressure or temperature is controllable, thereby avoiding potentially more serious accidents.

To ensure that the explosion-proof mechanism can be activated to an actuated state by the emissions in a timely manner when thermal runaway occurs, a specified space is usually left between the adapting member and the explosion-proof mechanism for the emissions generated in the case of thermal runaway to pass through.

However, in actual use of the battery, the emissions generated by thermal runaway of the battery cell still cannot be discharged through the explosion-proof mechanism in a timely manner, leading to separation of the end cap assembly from the shell of the battery cell in high pressure, and thus resulting in a risk of the battery catching fire or exploding. The inventors have found through long-term research that this problem is caused because an internal temperature in the shell rises sharply when thermal runaway occurs, and tabs of the electrode assembly and the adapting member approach the explosion-proof mechanism due to deformation caused by the internal temperature and barometric pressure, which makes the explosion-proof mechanism blocked by the adapting member and difficult to be activated to an actuated state by the emissions, so that the internal barometric pressure or temperature keep rising, and the end cap assembly is separated from the housing at the connection.

In view of this, an embodiment of this application provides an end cap assembly applied to a battery cell. A supporting member is provided at the end cap assembly, and located between an adapting member and an explosion-proof mechanism. The supporting member is made of a high-temperature-resistant material so that it is not easy to melt and deform when thermal runaway occurs in the battery cell, and supports the adapting member when the adapting member is deformed, reducing a possibility of the adapting member blocking the explosion-proof mechanism. In this way, the explosion-proof mechanism can be activated to an actuated state to release the emissions in the battery cell when thermal runaway occurs in the battery cell, reducing a possibility of the battery cell exploding and improving safety of the battery cell in use.

The battery cell in this embodiment of this application can be applied to various batteries, and the battery can also be applied to various apparatuses using the battery, such as mobile phones, portable devices, notebook computers, electromobile, electric toys, electric tools, electric vehicles, ships, and spacecrafts. For example, the spacecrafts include airplanes, rockets, space shuttles, and spaceships, but is not limited to thereto.

FIG. 1 is a schematic structural diagram of an electric apparatus according to an embodiment of this application. A vehicle is used as an example of the electric apparatus for description. The vehicle may be a fossil fuel vehicle, a natural gas vehicle, or a new energy vehicle. The new energy vehicle may be a battery electric vehicle, a hybrid electric vehicle, a range-extended electric vehicle, or the like. The vehicle includes a battery 200, a controller 210, and a motor 220. The battery 200 is configured to supply power to the controller 210 and the motor 220 as an operational power supply and a driving power supply of the vehicle. For example, the battery 200 is configured to supply power to meet the start, navigation, and operation requirements of the vehicle. For example, the battery 200 supplies power to the controller 210. The controller 210 controls the battery 200 to supply power to the motor 220. The motor 220 receives and uses the power of the battery 200 as the driving power supply of the vehicle, to replace or partially replace fuel oil or natural gas to provide driving power to the vehicle.

To meet different power usage demands, the battery 200 may include a plurality of battery cells 100, where the plurality of battery cells 100 may be connected in series, parallel, or series and parallel, and being connected in series and parallel refers to a combination of series and parallel connections. Optionally, the plurality of battery cells 100 may be connected in series, parallel or series and parallel to make up a battery module, and then a plurality of battery modules are connected in series, parallel, or series and parallel to make up the battery 200. To be specific, a plurality of battery cells 100 may directly make up the battery 200, or may make up a battery module, and then the battery modules make up the battery 200.

Figure 2:
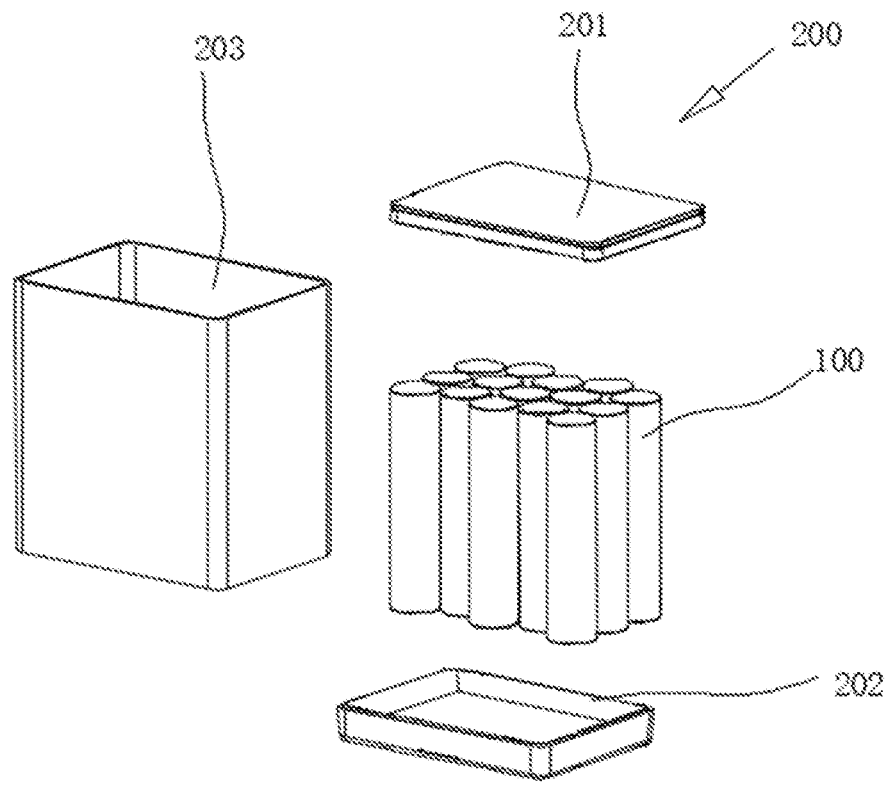
FIG. 2 is a schematic exploded structural diagram of a battery according to an embodiment of this application.

For example, FIG. 2 is a schematic structural diagram of a battery 200 according to an embodiment of this application. The battery 200 may include two or more battery cells 100. In addition, the battery 200 further includes a first box body 201, a second box body 202, and a third box body 203, where the third box body 203 may be a housing structure with an opening at each of two ends, and the first box body 201 and the second box body 202 are snap-fitted onto the openings respectively at the two ends of the third box body 203, to form an enclosed space for accommodating the battery cells 100. The plurality of battery cells 100 may be electrically connected in series, parallel, or series and parallel to make up a battery module, and then the battery modules are connected in series, parallel, or series and parallel to achieve a larger current or voltage. Optionally, the first box body 201, the second box body 202, and the third box body 203 may be made of a metal or plastic. For example, the first box body 201, the second box body 202, and the third box body 203 are all made of aluminum or an aluminum alloy.

In an embodiment, the plurality of battery cells 100 are placed vertically and arranged in a space enclosed by the first box body 201, the second box body 202, and the third box body 203. In some embodiments, both the first box body 201 and the second box body 202 are hermetically connected to the third box body 203.

Certainly, the structure of the box body is not limited to this, or may be another structure. For example, two open structures are snap-fitted with each other to form an enclosed space for accommodating the battery cells 100.

Figure 3:
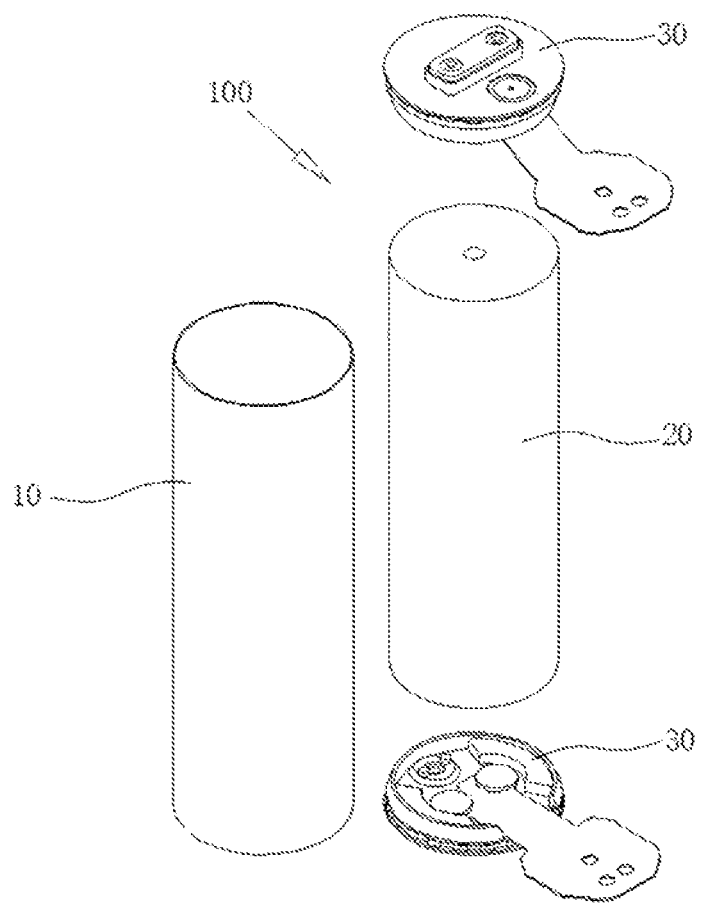
FIG. 3 is a schematic partial exploded diagram of a battery cell according to an embodiment of this application.

FIG. 3 is a schematic partial exploded structural diagram of a battery cell 100 disclosed in an embodiment of this application. The battery cell 100 may be a secondary battery or a primary battery, for example, a lithium-ion secondary battery, a lithium-ion primary battery, a lithium-sulfur battery, a sodium-lithium-ion battery, or a magnesium-ion battery, but is not limited thereto. The battery cell 100 may be cylindrical, flat, rectangular, or in other shapes, and in embodiment of this application, the battery cell 100 is cylindrical as an example for description.

The battery cell 100 includes a housing 10 and an electrode assembly 20 disposed in the housing 10. The housing 10 may be made of a metal material or plastic, and optionally, the housing 10 is made of aluminum or an aluminum alloy. The housing 10 is provided with an opening, and the opening may be on an end face of the housing 10. For example, the housing 10 includes two openings which are respectively on two end faces of the cylindrical housing 10, which means that the two end faces of the housing 10 have no end walls, and the inside of the housing 10 is open to the outside, so that the electrode assembly 20 can be placed into the housing 10 from any opening.

The electrode assembly 20 is formed by stacking or winding a positive electrode plate, a negative electrode plate, and a separator. The separator is sandwiched between the positive electrode plate and the negative electrode plate. The electrode assembly 20 has a positive tab and a negative tab. The positive and negative tabs are respectively facing one of the openings, and the opening is covered with an end cap assembly 30. The end cap assembly 30 is hermetically connected with the housing 10 at an opening of the housing 10 to form a hollow chamber, and after the electrode assembly 20 is placed into the housing 10, the housing 10 is filled with electrolyte and sealed.

Figure 4:
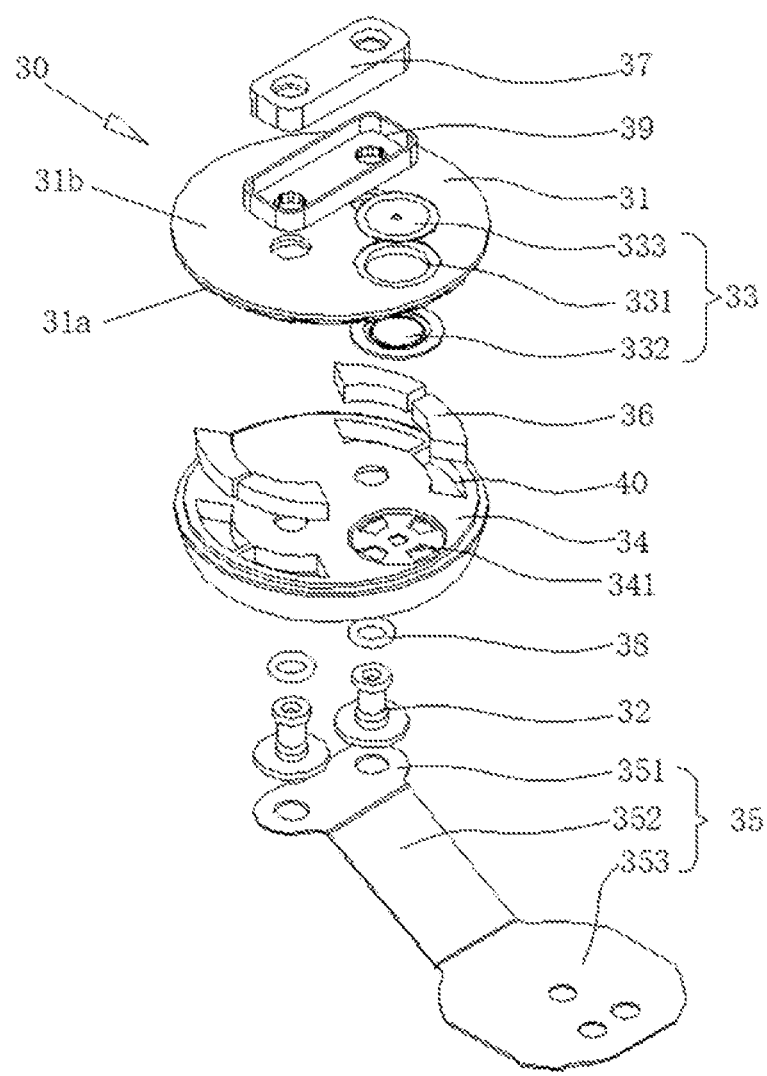
FIG. 4 is a schematic exploded diagram of an end cap assembly according to an embodiment of this application.

As shown in FIG. 4, FIG. 4 is a schematic exploded structural diagram of the end cap assembly 30 shown in FIG. 3. The end cap assembly 30 includes an end cap 31, an isolating component 34, an electrode terminal 32, and an adapting member 35. The electrode terminal 32 on the end cap assembly 30 corresponding to the positive tab of the electrode assembly 20 is a positive electrode terminal, and the electrode terminal 32 on the end cap assembly 30 corresponding to the negative tab of the electrode assembly 20 is a negative electrode terminal. The positive tab of the electrode assembly 20 is electrically connected to the positive electrode terminal, and the negative tab of the electrode assembly 20 is electrically connected to the negative electrode terminal.

The end cap 31 is basically in a shape of a flat plate, and has a first surface 31a and a second surface 31b. The first surface 31a is a surface facing the housing 10, and the second surface 31b is a surface facing away from the housing 10. The isolating component 34, the electrode terminal 32, and the adapting member 35 are all located on a side at which the first surface 31a is located. The end cap 31 may be made of a metal or plastic. Optionally, the end cap 31 is made of aluminum or an aluminum alloy, and hermetically connected to the opening of the housing 10 by welding.

The end cover 31 is provided with two run-through terminal holes, and both the isolating component 34 and the adapting member 35 are provided with through-holes corresponding to the terminal holes. The two electrode terminals 32 run through the through-holes and the terminal holes, and are riveted with a riveting block 37 on the second surface of the end cap 31. An insulating member 39 is sandwiched between the riveting block 37 and the end cap 31 for insulation between the electrode terminal 32 and the end cap 31. A sealing ring 38 is provided between an outer wall of the electrode terminal 32 and an inner wall of the terminal hole. By compressing the sealing ring 38, the terminal hole can be hermetically sealed, and the electrode terminal 32 and the terminal hole can be combined more firmly.

The end cap 31 is provided with an explosion-proof mechanism 33. The explosion-proof mechanism 33 is capable of being actuated to release an internal pressure of the battery cell 100 when thermal runaway occurs in the battery cell 100. For example, the explosion-proof mechanism 33 may be part of a thin and weak zone of the end cap 31, or the end cap 31 is provided with an explosion-proof through-hole 331, an explosion-proof piece 332 is disposed on the end cap 31 and seals the explosion-proof through-hole 331, and the explosion-proof piece 332 can be damaged by emissions generated in the battery cell 100 when thermal runaway occurs.

For example, the strength of the thin and weak zone or the explosion-proof piece 332 can be reduced by reducing thickness of the thin and weak zone or the explosion-proof piece 332, so that the thin and weak zone or the explosion-proof piece 332 is more likely to be damaged by emissions than other zones of the end cap 31. The second surface of the explosion-proof mechanism 33 close to the end cap 31 is provided with a patch 333. The patch 333 covers the explosion-proof through-hole 331 to prevent the explosion-proof piece 332 from being damaged by an external force. In addition, when thermal runaway occurs, the patch 333 can be pushed away by the emissions in the battery cell 100 to release the emissions.

The isolating component 34 is disposed on the first surface 31a of the end cap 31, and is made of an insulating material, generally made of plastic, rubber, or another material, to separate the end cap 31 from the electrode assembly 20, reducing a risk of short circuit. The isolating component 34 is provided with a discharge hole 341 for the emissions to pass through, and the discharge hole 341 is disposed directly opposite the explosion-proof mechanism 33.

With reference to FIG. 3 and FIG. 4, the adapting member 35 is located between the electrode assembly 20 and the isolating component 34. One end of the adapting member is connected to the electrode terminal 32, and the other end of the adapting member is connected to the positive tab or negative tab of the electrode assembly 20 for implementation of an electrical connection between the electrode assembly 20 and the electrode terminals 32. Due to a limited internal space in the battery cell 100, an orthographic projection of the adapting member 35 on the first surface of the end cap 31 usually at least partially overlaps an orthographic projection of the explosion-proof mechanism 33 on the first surface of the end cap 31.

During use of the battery cell 100, under the condition that overcharge, an impact, or the like occurs in the battery cell 100, and that the electrode assembly 20 is short-circuited and generates a large amount of gas and heat, this condition is referred to as thermal runaway of the battery cell 100. In the case of thermal runaway, high-temperature and high-pressure emissions in the battery cell 100, after being accumulated in the shell to a certain extent, may damage the explosion-proof mechanism 33 and be discharged from the explosion-proof mechanism 33, that is, the explosion-proof mechanism 33 is actuated. With the actuation of the explosion-proof mechanism 33, occurrence of accidents such as firing and explosion due to continuous accumulation of the emissions are avoided.

However, because the battery cell 100 is in a thermal runaway state, its internal temperature and barometric pressure rise, which causes the adapting member 35 to deform toward the end cap 31. In this case, the isolating component 34 may be melted and become soft, and is unable to support the adapting member 35, causing the adapting member 35 to continue to deform and butt up against the explosion-proof mechanism 33, thereby blocking the explosion-proof mechanism 33. As a result, the explosion-proof mechanism 33 is difficult to be damaged by the emissions in the battery cell 100 to release a pressure in the battery cell 100, thereby causing an explosion risk.

To resolve the above problem, with reference to FIG. 4, in an embodiment of this application, a supporting member 36 is provided between the adapting member 35 and the end cap 31. The supporting member 36 is made of a high-temperature-resistant material, such as ceramics, mica, or high temperature resistant resin. The supporting member 36 may be ring, U-shaped, prismatic, cylindrical, or special-shaped, which is not limited herein. The number of supporting members 36 may be one or more, provided that it is ensured that an orthographic projection of the adapting member 35 on the first surface at least partially overlaps an orthographic projection of the supporting member 36 on the first surface, such that when thermal runaway occurs in the battery cell 100, the supporting member 36 is capable of supporting the adapting member 35 to prevent the adapting member 35 from blocking the explosion-proof mechanism 33.

In an embodiment, a melting point of the supporting member 36 is greater than 300° C., so as to ensure that the supporting member 36 will not be melted and deformed by the emissions when thermal runaway occurs. In this way, when the adapting member 35 is deformed, the adapting member 35 will not directly butt up against and block the explosion-proof mechanism 33. Therefore, in the case of thermal runaway, the high-temperature and high-pressure emissions in the battery cell 100 can actuate the explosion-proof mechanism 33 and be discharged through the explosion-proof mechanism 33, preventing the battery cell 100 from burning or even exploding, and improving safety of the battery cell 100 in use.

In an embodiment, the supporting member 36 is made of an insulating material to avoid a problem of short circuit caused by the supporting member 36 in use.

In an embodiment, the supporting member 36 includes supporting blocks, and the supporting blocks are disposed between the adapting member 35 and the end cap 31. For example, as shown in FIG. 4, there are two sets of supporting blocks, and each set includes two arc-shaped strip supporting blocks. An orthographic projection of the supporting block on the first surface is staggered from an orthographic projection of the explosion-proof mechanism 33 on the first surface, to ensure that when thermal runaway occurs, the explosion-proof mechanism 33 can be damaged to discharge gas. For example, the supporting blocks may be fixed to the isolating component 34, to prevent the supporting block from shifting and failing to provide good support for the adapting member 35, or from affecting actuation of the explosion-proof mechanism 33. A specific fastening method of the supporting blocks will be described in the following embodiments.

As shown in FIG. 4, in an embodiment, the isolating component 34 is provided with accommodating grooves 40, the supporting blocks are disposed in the accommodating grooves 40. An opening is provided at a side of the accommodating groove 40 for putting the supporting block in, which means that a part of the supporting block is not enclosed by the groove wall of the accommodating groove 40, and this facilitates the positioning of the supporting block.

Figure 5:
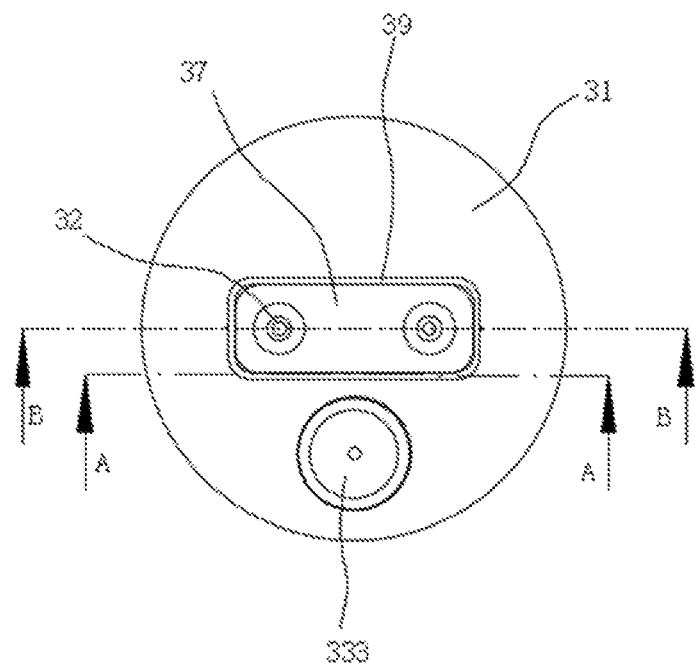
FIG. 5 is a top view of an end cap assembly according to an embodiment of this application.
Figure 6:
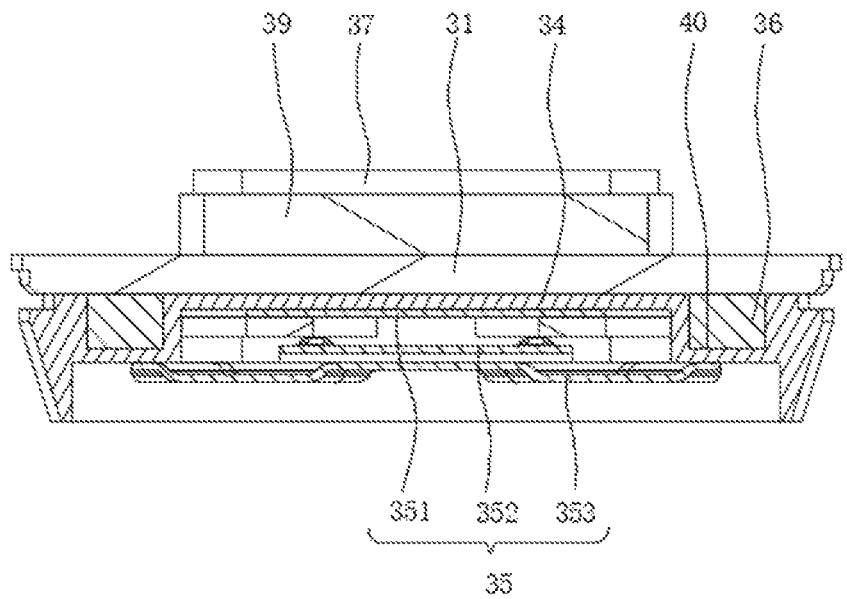
FIG. 6 is a schematic cross-sectional view of an end cap assembly in a plane A-A in FIG. 5 according to an embodiment of this application.

For example, as shown in FIG. 4, FIG. 5, and FIG. 6, the opening of the accommodating groove 40 faces the end cap 31, one end of the supporting block abuts against the bottom wall of the accommodating groove 40, and the other end of the supporting block abuts against the end cap 31. FIG. 5 is a schematic top view of the end cap assembly 30, and FIG. 6 shows a schematic cross-sectional view when the opening of the accommodating groove 40 faces the end cap 31.

Figure 7:
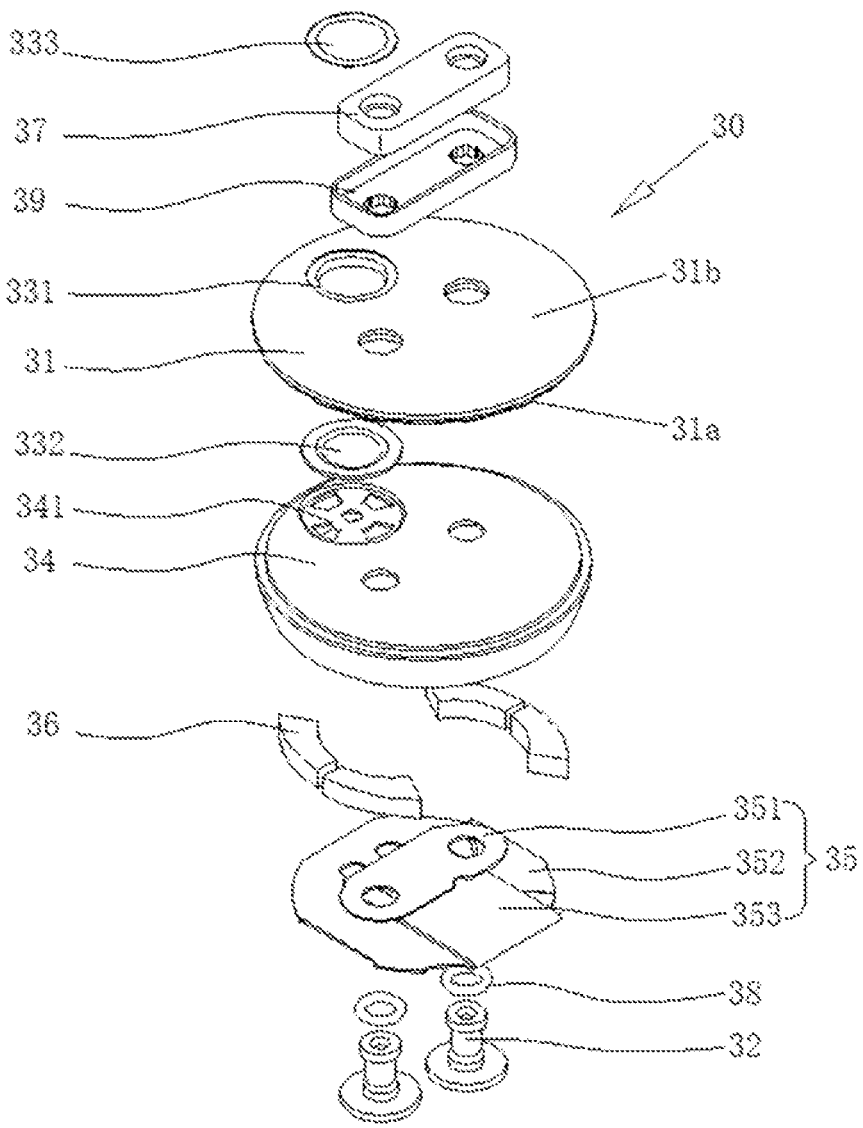
FIG. 7 is a schematic exploded diagram of an end cap assembly according to another embodiment of this application.

For another example, as shown in FIG. 7, FIG. 7 is a schematic exploded view of the end cap assembly 30, showing a case in which the supporting block is located on a side of the isolating component 34 close to the adapting member 35. In this case, the opening of the accommodating groove 40 faces the adapting member 35, and one end of the supporting block butts up against the bottom wall of the accommodating groove 40, and the other end of the supporting block butts up against the adapting member 35.

The above two opening modes of the accommodating groove 40 enable the side wall of the accommodating groove 40 to limit the position of the supporting block in a direction perpendicular to the first surface, so that the supporting block can always be located at a position corresponding to the adapting member 35, forming a stable support for the adapting member 35 without restricting actuation of the explosion-proof mechanism 33. The two ends of the supporting block respectively butt up against the bottom wall of the accommodating groove 40 and against the end cap 31 or the adapting member 35, which can prevent the supporting block from disengaging from the opening of the accommodating groove 40, resulting in a situation that it is difficult to support the adapting member 35 in the case of thermal runaway.

Figure 8:
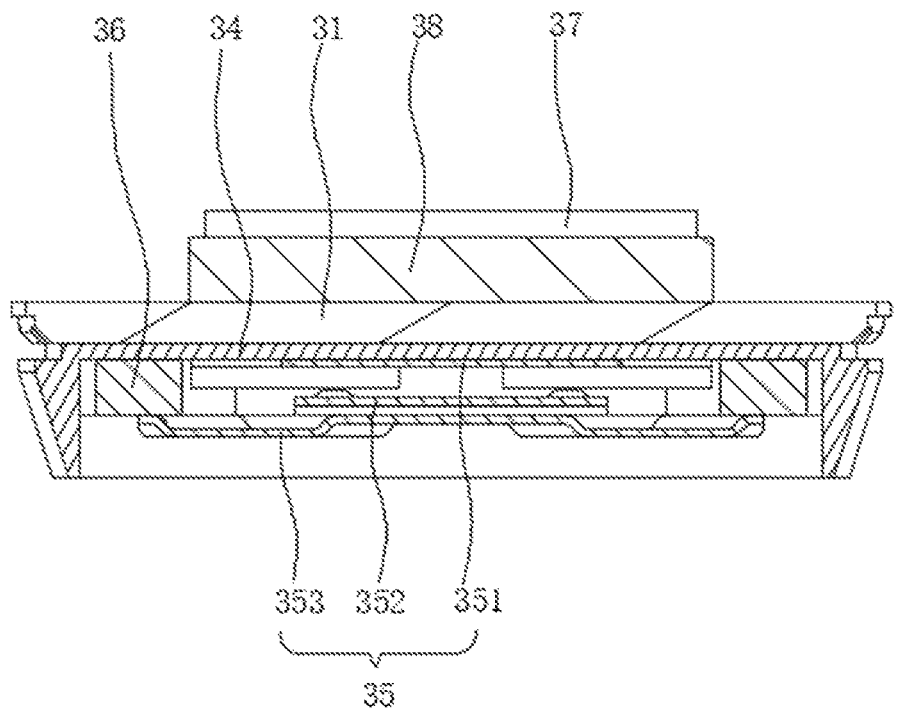
FIG. 8 is a schematic cross-sectional view of an end cap assembly in a direction shown by a plane A-A in FIG. 5 according to another embodiment of this application.

As shown in FIG. 8, in another embodiment, the supporting block is pasted and fixed on the isolating component 34. The supporting block can be pasted on a surface of the isolating component 34 facing the end cap 31 or on a side of the isolating component 34 facing the adapting member 35. For example, heat-resistant glue can be used for pasting. This way of fixing the supporting block can also achieve the purpose of preventing a condition in which the supporting block shifts and has difficulty in supporting the adapting member 35 in the case of thermal runaway. FIG. 8 shows a state in which the supporting block is pasted and fixed on a surface of the isolating component 34 facing the adapting member 35.

In another embodiment, the supporting block may alternatively be fixed on the isolating component 34 by injection molding.

In another embodiment, the isolating component 34 is made of a high-temperature-resistance insulating material, such as ceramics, mica, or high temperature resistant resin. The isolating component 34 and the supporting block may be made of a same material, or different materials. The support block can be fixed on the isolating component 34 by using the fixing method of the supporting block in any one of the above embodiments. In this case, when thermal runaway occurs, the isolating component 34 is not easy to melt, and not only plays a role of insulation, but also supports the adapting member 35, further reducing the possibility of the adapting member 35 blocking the explosion-proof mechanism 33.

Figure 9:
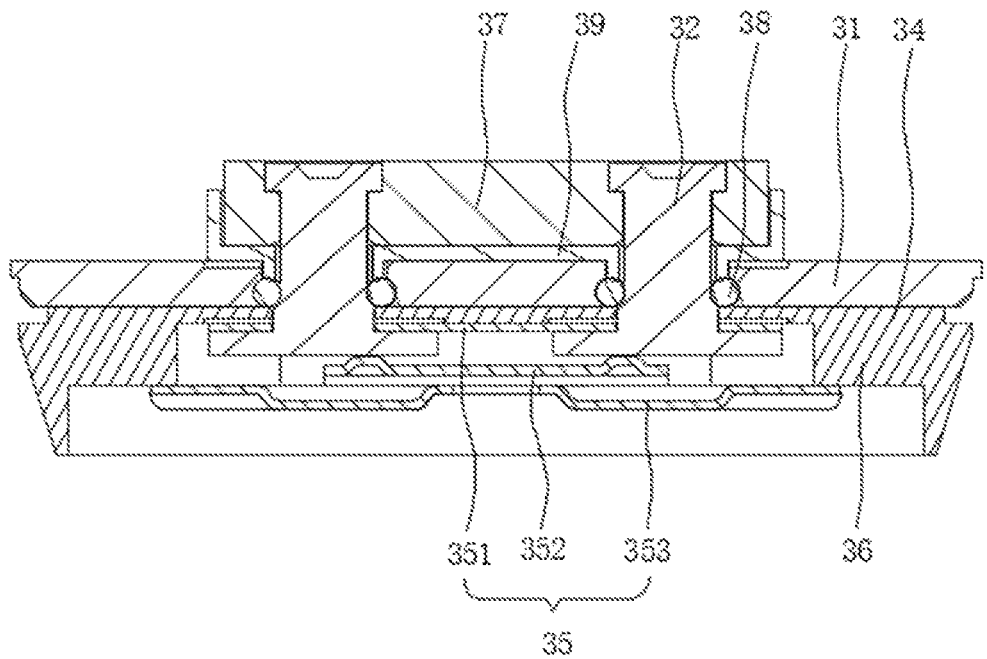
FIG. 9 is a schematic cross-sectional view of an end cap assembly in a direction shown by a plane B-B in FIG. 5 according to another embodiment of this application.

As shown in FIG. 9, in an embodiment, when the supporting block and the isolating component 34 are made of a same high-temperature-resistant material, for the convenience of processing and assembling, the supporting block and the isolating component 34 can be integrally formed, thereby greatly improving processing efficiency of the end cap assembly 30, and reducing manufacturing costs of the end cap assembly 30.

In the foregoing embodiments of this application, the adapting member 35 includes a first connecting section 351, a second connecting section 352, and a third connecting section 353. The first connecting section 351 is connected to the electrode terminal 32 of the battery cell 100, the third connecting section 353 is used to connect to the electrode assembly 20 in the housing 10 of the battery cell 100, and the second connecting section 352 is connected to the first connecting section 351 and the third connecting section 353. For example, the first connecting section 351, the second connecting section 352, and the third connecting section 353 may be formed by bending a same elastic metal sheet.

To save internal space in the battery cell 100, with reference to FIG. 8 and FIG. 9, a specific arrangement may be made such that an orthographic projection of the first connecting section 351 on the first surface does not overlap the orthographic projection of the explosion-proof mechanism 33 on the first surface, and an orthographic projection of the third connecting section 353 on the first surface at least partially overlaps the orthographic projection of the supporting member 36 on the first surface, such that when thermal runaway occurs in the battery cell 100, the supporting member 36 is capable of supporting the third connecting section 353 to prevent the third connecting section 353 from blocking the explosion-proof mechanism 33.

The adapting member 35 directly supports the third connecting section 353, such that there is always a gap between the first connecting section 351 and the third connecting section 353, for emissions generated when thermal runaway occurs in the battery cell 100 to pass through. In addition, the supporting member 36 is located within heights of the first connecting section 351 and the third connecting section 353, and an arrangement of the supporting member 36 does not occupy additional space inside the housing 10, thereby reducing a volume of the battery cell 100 and increasing energy density of the battery cell 100.

As shown in FIG. 4 and FIG. 7, in some embodiments, the adapting member 35 is provided with a through-hole directly facing the explosion-proof mechanism 33 for emissions generated when thermal runaway occurs in the battery cell 100 to pass through. The through-hole may be specifically disposed on the third connecting section 353. The emissions in the battery cell 100 can reach the explosion-proof mechanism 33 through the through-hole, and be discharged through the explosion-proof mechanism 33, further ensuring a smooth gas discharge when thermal runaway occurs in the battery cell 100.

In conclusion, in the foregoing embodiments of this application, the supporting member 36 made of a high-temperature-resistant material is provided at the end cap assembly 30, and the supporting member 36 and the adapting member 35 are arranged at specific locations, such that when the end cap assembly 30 is used for the battery cell 100, the supporting member 36 is capable of supporting the adapting member 35 to reduce possibility of the adapting member 35 blocking the explosion-proof mechanism 33. In this way, when thermal runaway occurs in the battery cell 100, the explosion-proof mechanism 33 can be activated to an actuated state to release the emissions in the battery cell 100, such that when thermal runaway occurs in the battery cell 100, the explosion-proof mechanism 33 can reduce possibility of the battery cell 100 exploding and improve safety of the battery cell 100 in use.

Figure 10:
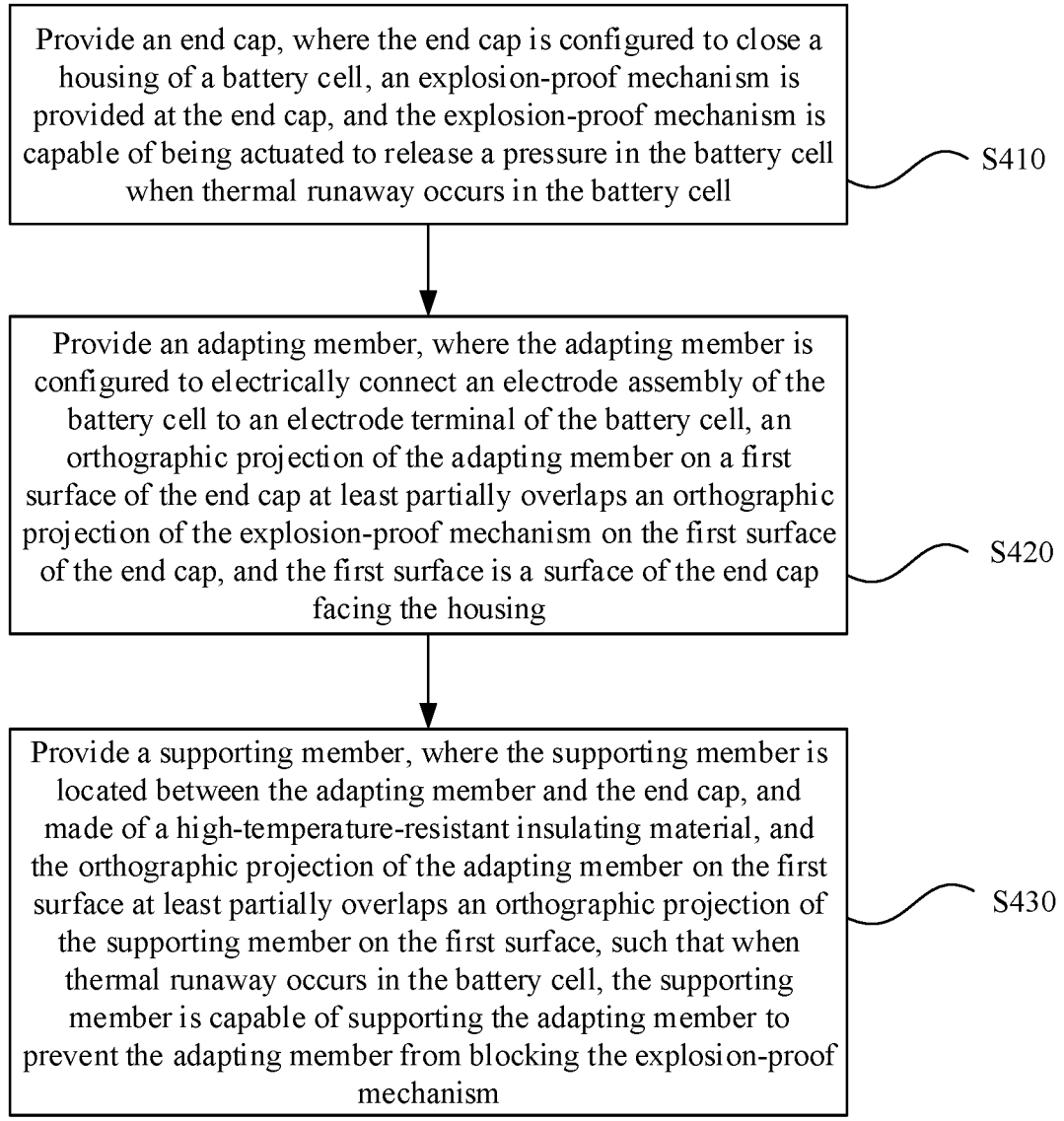
FIG. 10 is a flowchart of manufacturing an end cap assembly according to an embodiment of this application.

In addition, another aspect of this application provides a manufacturing method of end cap assembly 30, the manufactured end cap assembly 30 is configured to hermetically sealing an opening of a housing 10 of a battery cell 100. As shown in FIG. 10, the method includes the following steps.

S410: Provide an end cap 31, where the end cap 31 is configured to close the housing 10 of the battery cell 100, an explosion-proof mechanism 33 is provided at the end cap 31, and the explosion-proof mechanism 33 is capable of being actuated to release a pressure in the battery cell 100 when thermal runaway occurs in the battery cell 100.

S420: Provide an adapting member 35, where the adapting member 35 is configured to electrically connect an electrode assembly 20 of the battery cell 100 to an electrode terminal 32 of the battery cell 100, an orthographic projection of the adapting member 35 on a first surface 31a of the end cap 31 at least partially overlaps an orthographic projection of the explosion-proof mechanism 33 on the first surface 31a of the end cap 31, and the first surface 31a is a surface of the end cap 31 facing the housing 10.

S430: Provide a supporting member 36, where the supporting member 36 is located between the adapting member 35 and the end cap 31, and made of a high-temperature-resistant insulating material, and the orthographic projection of the adapting member 35 on the first surface at least partially overlaps an orthographic projection of the supporting member 36 on the first surface 31a, such that when thermal runaway occurs in the battery cell 100, the supporting member 36 is capable of supporting the adapting member 35 to prevent the adapting member 35 from blocking the explosion-proof mechanism 33.

It should be noted that in the foregoing manufacturing method of end cap assembly 30, the order between the steps is not exactly in accordance with the above arrangement order. In the actual manufacturing process of end cap assembly 30, based on an actual situation, the foregoing steps can be adjusted in their orders or performed simultaneously, or other steps are added to manufacture another component of the end cap assembly 30 to obtain the required end cap assembly 30 finally. For details, refer to the embodiments of the end cap assembly 30.

Figure 11:
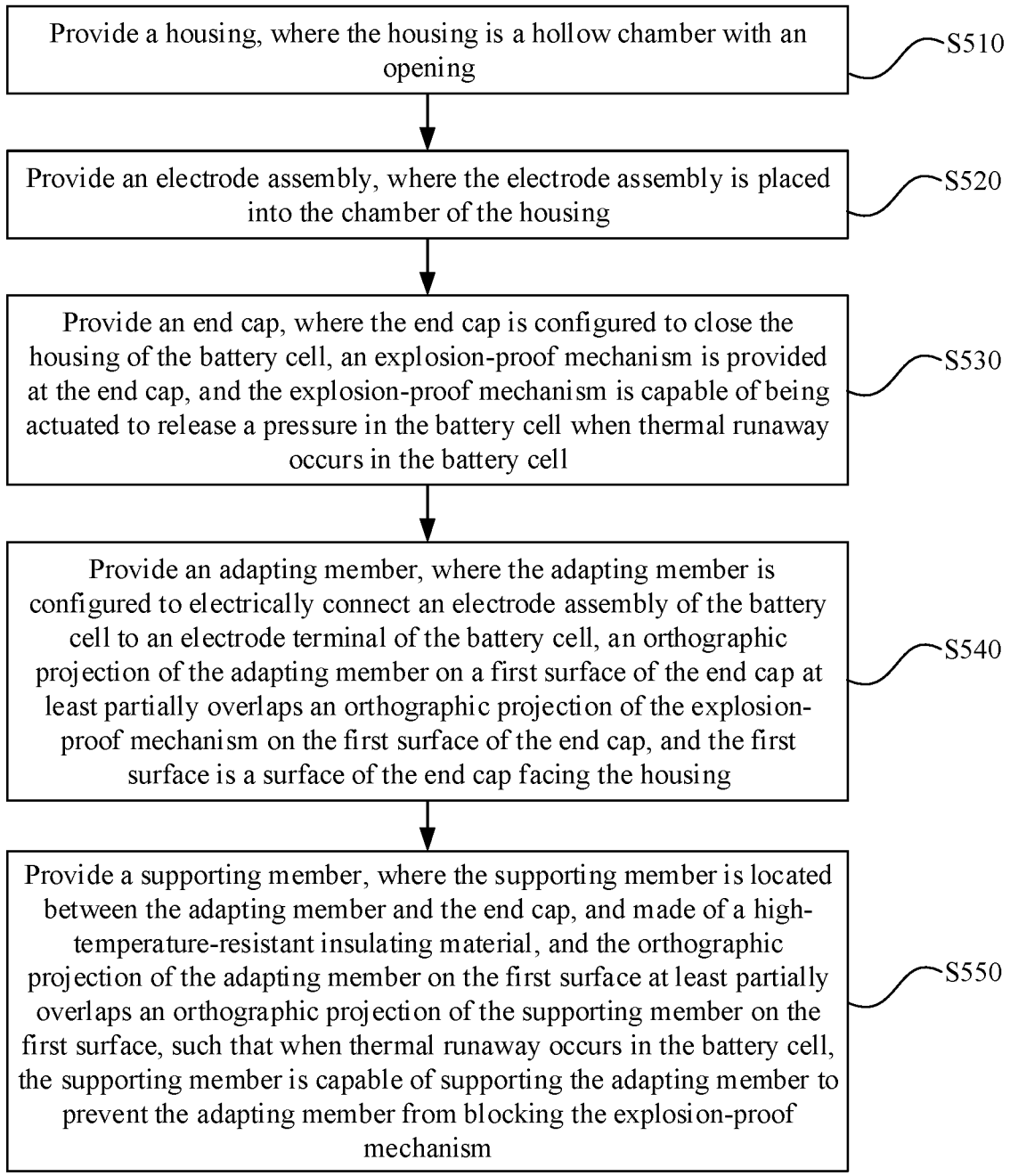
FIG. 11 is a flowchart of manufacturing a battery cell according to an embodiment of this application.

A still another aspect of this application further provides a manufacturing method of battery cell 100. As shown in FIG. 11, the method includes the following steps.

S510: Provide a housing 10, where the housing 10 is a hollow chamber with an opening.

S520: Provide an electrode assembly 20, where the electrode assembly 20 is placed into the chamber of the housing 10.

S530: Provide an end cap 31, where the end cap 31 is configured to close the housing 10 of the battery cell 100, an explosion-proof mechanism 33 is provided at the end cap 31, and the explosion-proof mechanism 33 is capable of being actuated to release an internal pressure in the battery cell 100 when thermal runaway occurs in the battery cell 100.

S540: Provide an adapting member 35, where the adapting member 35 is configured to electrically connect an electrode assembly 20 of the battery cell 100 to an electrode terminal 32 of the battery cell 100, an orthographic projection of the adapting member 35 on a first surface 31a of the end cap 31 at least partially overlaps an orthographic projection of the explosion-proof mechanism 33 on the first surface 31a of the end cap 31, and the first surface is a surface of the end cap 31 facing the housing 10.

S550: Provide a supporting member 36, where the supporting member 36 is located between the adapting member 35 and the end cap 31, and made of a high-temperature-resistant insulating material, and the orthographic projection of the adapting member 35 on the first surface 31a at least partially overlaps an orthographic projection of the supporting member 36 on the first surface 31a, such that when thermal runaway occurs in the battery cell 100, the supporting member 36 is capable of supporting the adapting member 35 to prevent the adapting member 35 from blocking the explosion-proof mechanism 33.

The above order between the steps is not exactly in accordance with the above arrangement order. In the actual manufacturing process of battery cell 100, based on an actual situation, the foregoing steps can be adjusted in their orders or performed simultaneously, or other steps are added to manufacture another component of the battery cell 100 to obtain the required battery cell 100 finally. For details, refer to the embodiments of the battery cell 100.

In addition, any methods for manufacturing related components and connecting related components fall within the protection scope of the embodiments of this application, and details are not described herein in the embodiments of this application.

Mutual reference may be made between features in the above protected subject matters and embodiments of this application. In a case that the structure permits, persons skilled in the art can also flexibly combine the technical features in different embodiments to form more embodiments.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An end cap assembly, comprising:
an end cap configured to close a housing of a battery cell, an explosion-proof mechanism being provided at the end cap and being configured to be actuated to release an internal pressure of the battery cell in response to thermal runaway occurring in the battery cell;
an adapting member configured to electrically connect an electrode assembly of the battery cell to an electrode terminal of the battery cell;
an isolating component provided between the adapting member and the end cap, and configured to insulate the adapting member from the end cap; and
a supporting member provided between the adapting member and the end cap;
wherein:
an orthographic projection of the adapting member on a first surface of the end cap at least partially overlaps an orthographic projection of the explosion-proof mechanism on the first surface of the end cap, the first surface being a surface of the end cap facing the housing;
the orthographic projection of the adapting member on the first surface at least partially overlaps an orthographic projection of the supporting member on the first surface, to enable the supporting member to support the adapting member to prevent the adapting member from blocking the explosion-proof mechanism when thermal runaway occurs in the battery cell; and
at least a portion of the adapting member and at least a portion of the isolating component are separated from each other by a spacing along a direction perpendicular to the first surface.

2. The end cap assembly according to claim 1, wherein a melting point of the supporting member is greater than 300° C.

3. The end cap assembly according to claim 1, wherein the supporting member is made of an insulating material.

4. The end cap assembly according to claim 1, wherein the supporting member comprises a supporting block, and the supporting block is disposed between the adapting member and the end cap.

5. The end cap assembly according to claim 4, wherein an orthographic projection of the supporting block on the first surface is staggered from the orthographic projection of the explosion-proof mechanism on the first surface.

6. The end cap assembly according to claim 4, wherein the supporting block is fixed to the isolating component.

7. The end cap assembly according to claim 6, wherein the isolating component is provided with an accommodating groove, and the supporting block is disposed in the accommodating groove.

8. The end cap assembly according to claim 7, wherein an opening is provided at a side of the accommodating groove for placing the supporting block into the accommodating groove.

9. The end cap assembly according to claim 8, wherein:
the opening faces the end cap, one end of the supporting block butts up against a bottom wall of the accommodating groove, and another end of the supporting block butts up against the end cap; or
the opening faces the adapting member, one end of the supporting block butts up against the bottom wall of the accommodating groove, and another end of the supporting block butts up against the adapting member.

10. The end cap assembly according to claim 6, wherein the supporting block and the isolating component are made of a same material and are integrally formed.

11. The end cap assembly according to claim 4, wherein the adapting member is supported on a surface of the supporting block that is furthest away from the end cap among all surfaces of the supporting block.

12. The end cap assembly according to claim 1, wherein:
the adapting member comprises a first connecting section, a second connecting section, and a third connecting section, the first connecting section is connected to the electrode terminal of the battery cell, the third connecting section is configured to be connected to the electrode assembly in the housing of the battery cell, and the second connecting section connects the first connecting section and the third connecting section; and
an orthographic projection of the first connecting section on the first surface does not overlap the orthographic projection of the explosion-proof mechanism on the first surface, and an orthographic projection of the third connecting section on the first surface at least partially overlaps the orthographic projection of the supporting member on the first surfaces, to enable the supporting member to support the third connecting section to prevent the third connecting section from blocking the explosion-proof mechanism when thermal runaway occurs in the battery cell.

13. The end cap assembly according to claim 1, wherein the adapting member is provided with a through-hole directly facing the explosion-proof mechanism and configured to allow emissions generated when thermal runaway occurs in the battery cell to pass through.

14. A battery, comprising:
two or more battery cells, each comprising:
an electrode assembly;
a housing; and
the end cap assembly according to claim 1;
wherein the housing includes a hollow chamber with an opening, the electrode assembly is accommodated in the hollow chamber, and the end cap assembly covers the opening of the housing.

15. An electric apparatus, comprising:
a battery cell configured to provide electric energy, the battery cell comprising:
an electrode assembly;
a housing; and
an end cap assembly, comprising:
an end cap configured to close the housing, an explosion-proof mechanism being provided at the end cap and being configured to be actuated to release an internal pressure of the battery cell in response to thermal runaway occurring in the battery cell;
an adapting member configured to electrically connect the electrode assembly to an electrode terminal of the battery cell;
an isolating component provided between the adapting member and the end cap, and configured to insulate the adapting member from the end cap; and
a supporting member provided between the adapting member and the end cap;
wherein:
an orthographic projection of the adapting member on a first surface of the end cap at least partially overlaps an orthographic projection of the explosion-proof mechanism on the first surface of the end cap, the first surface being a surface of the end cap facing the housing;
the orthographic projection of the adapting member on the first surface at least partially overlaps an orthographic projection of the supporting member on the first surface, to enable the supporting member to support the adapting member to prevent the adapting member from blocking the explosion-proof mechanism when thermal runaway occurs in the battery cell;
at least a portion of the adapting member and at least a portion of the isolating component are separated from each other by a spacing along a direction perpendicular to the first surface; and
the housing includes a hollow chamber with an opening, the electrode assembly is accommodated in the hollow chamber, and the end cap assembly covers the opening of the housing.

16. A battery cell manufacturing method, comprising:
providing a housing, the housing including a hollow chamber with an opening;
placing an electrode assembly into the hollow chamber of the housing;
providing an end cap, the end cap being configured to close the housing of the battery cell, an explosion-proof mechanism being provided at the end cap and being configured to be actuated to release an internal pressure of the battery cell in response to thermal runaway occurring in the battery cell;
providing an adapting member, the adapting member being configured to electrically connect the electrode assembly of the battery cell to an electrode terminal of the battery cell, an orthographic projection of the adapting member on a first surface of the end cap at least partially overlapping an orthographic projection of the explosion-proof mechanism on the first surface of the end cap, and the first surface being a surface of the end cap facing the housing;
providing an isolating component between the adapting member and the end cap, the isolating component being configured to insulate the adapting member from the end cap, and at least a portion of the adapting member and at least a portion of the isolating component being separated from each other by a spacing along a direction perpendicular to the first surface; and
providing a supporting member between the adapting member and the end cap, the orthographic projection of the adapting member on the first surface at least partially overlapping an orthographic projection of the supporting member on the first surface, to enable the supporting member to support the adapting member to prevent the adapting member from blocking the explosion-proof mechanism when thermal runaway occurs in the battery cell.

* * * * *